Patented Jan. 31, 1939

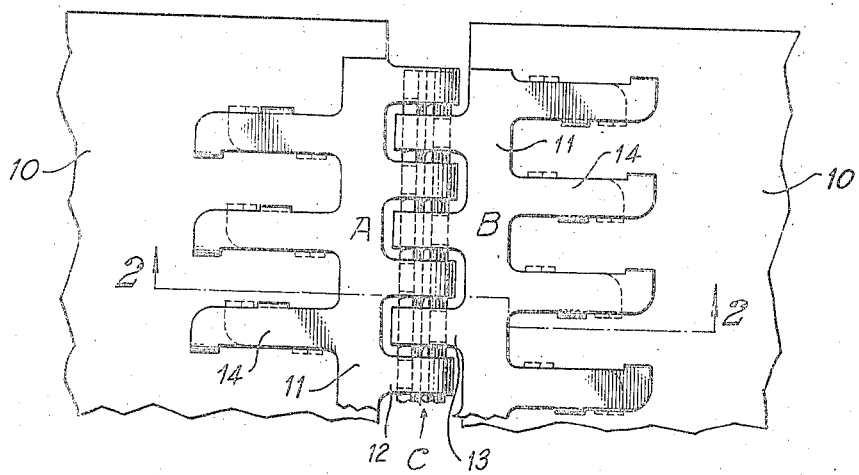
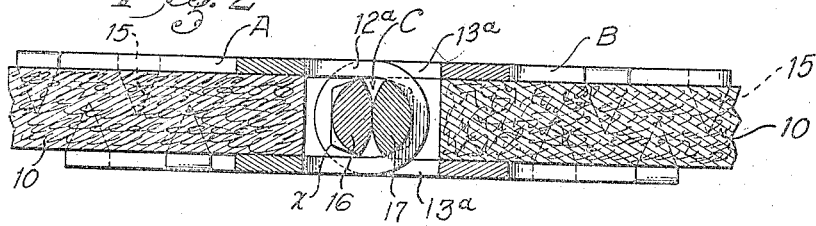
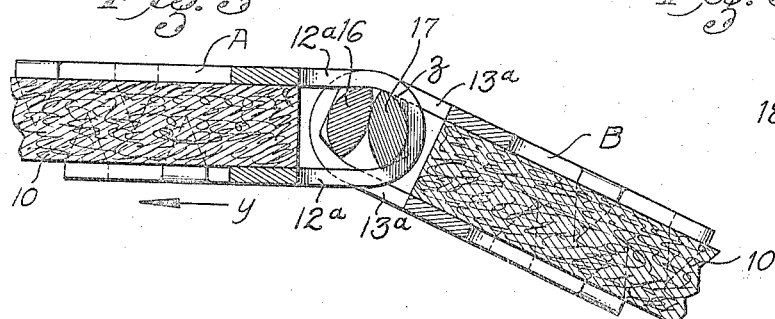
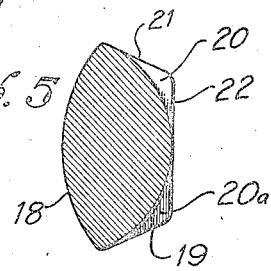
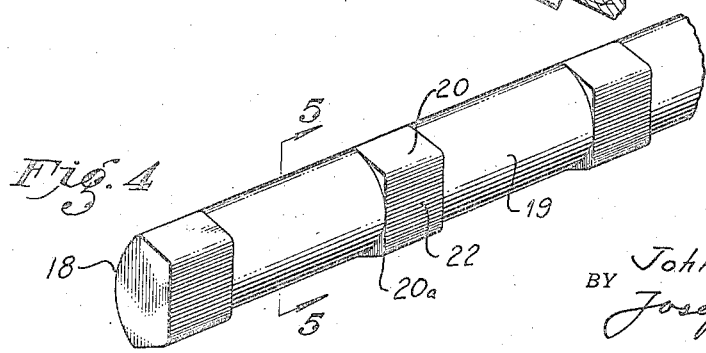

2,145,455

UNITED STATES PATENT OFFICE 2,145,455

FLEXIBLE BELT FASTENER

John C. Olsen, Chicago, Ill., assignor to Flexible Steel Lacing Company, Chicago, Ill., a corporation of Illinois Application October 5, 1937, Serial No. 167,407

7 Claims. (Cl. 24—33)

This invention relates to improvements in flexible belt fastener.

One object of the invention is to provide, in a flexible or hinged sectional rocker pin type of fastener for belts and the like, an improved construction which will minimize wear and breakage of the fastener parts and, more particularly, minimize the so-called "whipping" action of the fastener which occurs when the belt is running over pulleys.

Another object of the invention is to provide a sectional rocker hinge pin for belt fasteners and the like, which hinge pin possesses greater strength and longer life than former types of rocker hinge pins for a similar purpose.

A specific object of the invention is to provide a sectional rocker hinge pin with specially formed lugs or shoulders, which, in cooperation with interdigitated loop fastener plates or lacings, not only perform their usual function of preventing endwise displacement of the pin while in use but, in addition, function to prevent or at least minimize the slipping or scuffing of the two sections of the pin on each other when in use.

Other objects of the invention will more clearly appear from the description and claims hereinafter following.

In the drawing forming a part of this specification, Figure 1 is a broken plan view of portions of adjacent ends of a belt showing the improved fastener in connection therewith. Figure 2 is a vertical sectional view corresponding substantially to the line 2—2 of Figure 1, but upon a somewhat larger scale. Figure 3 is a view similar to Figure 2, but illustrating the two ends of the belt angularly disposed with reference to each other to more clearly indicate the mode of functioning of the improved fastener. Figure 4 is a perspective view of a portion of one of the hinge pin sections. And Figure 5 is a transverse sectional view of a hinge pin section corresponding substantially to the line 5—5 of Figure 4, but upon a somewhat enlarged scale.

In said drawing, 10—10 indicates the adjacent ends of a belt, conveyor or other flexible type of power transmitter, which are adapted to be flexibly or hingedly connected by a fastener. The improved fastener, as shown, comprises two attaching members, plates or lacings indicated broadly by the reference characters A and B and the hinge pin indicated generally by the reference character C.

The attaching members A and B are of like formation and each comprises two main sections 11—11 extending parallel to the end edge of the belt, said sections 11—11 being integrally formed with loops. The loops, as shown, are of the rounded end type with substantially parallel arms extending therefrom, the loops on the member A being indicated generally by the reference character 12 and the arms thereof as 12a—12a and those on the member B being indicated generally by the reference character 13 and the arms thereof as 13a—13a. As clearly apparent from the drawing, the loops 12 of the member A are alternated with or interdigitated with respect to the loops 13 of the member B, thus placing the loops in alinement transversely of the belt in a common manner. The attaching members A and B are provided with extensions 14—14 with prongs 15—15 to clinch the same to the belt, as shown.

The improved rocker hinge pin C comprises two preferably alike hinge pin elements or sections referenced, for convenience of description, 16 and 17. Each of said pin elements, as best shown in Figures 4 and 5, is of substantially double convex cross section with a continuous uninterrupted convex rolling bearing surface 18 on what may be termed its inner side, and a convex bearing or seating surface 19 on its other or outer side. Along the bearing surface 19, at spaced intervals therealong, each pin element is also provided with pairs of lugs 20—20a of special formation, as about to be described. Preferably, the spacing of the pairs of lugs 20—20a, longitudinally of the pin elements, is such as to correspond with the spacing of the loops of the members A and B. Further, the lugs 20—20a are also preferably of a width, that is, of a dimension extending lengthwise of the pin element, slightly less than the width of the loops 12 and 13.

As best shown in Figure 5, the lugs 20 and 20a are similarly located one above and the other below the longitudinal center line of the seating surface 19, that is, above and below the horizontal minor axis of the double convex section, as the pin element is positioned in Figure 5. Each lug projects outwardly beyond the main seating surface 19 and preferably is formed of two planar surfaces 21 and 22, the former being approximately tangent to the surface 19 along the line of intersection of the two surfaces 18 and 19, and the other planar surface 22 being substantially tangent to the surface 19 at the center line thereof, as shown. The exact angle of intersection between the two flat lug surfaces 21 and 22 will vary somewhat for different sizes of rocker hinge pins and in accordance with the limited amount of angular movement desired, hereinafter explained.

As will be understood by those skilled in the art, the fastener is applied to the belt ends in the following manner. The members A and B are first separately attached to their respective belt ends, the spacing of the loops 12 and 13 from the end edges of the belt being determined by a gauge pin during the clinching operation, as will be understood. When the members A and B have been attached, their loops are interdigitated, as shown, and the two ends of the belt pushed together as far as posible, thus obtaining the maximum spacing, in a line parallel to the belt, between the opposed sets of rounded ends of the loops 12 and 13. The two sections or elements of the rocker hinge pin, assembled with their roller bearing faces 18 in engagement as shown in Figure 2, are then inserted endwise through the loops. The belt ends are then pulled apart, thus seating the loops 12 of the attaching member A between the sets of lugs 20—20ª of the hinge pin element 16 and the loops 13 of the attaching member B between the lugs 20—20ª of the other hinge pin element 17. As shown in the drawing, the seating surfaces 19 of the hinge pin elements are made such as to fit snugly the inner curved surfaces of the rounded ends of the loops 12 and 13. It will further be observed that the major or vertical diameters of the hinge pin elements 16 and 17 are made to correspond substantially with the spacing between the parallel arms 12ª—12ª and 13ª—13ª of the loops 12 and 13, as shown in Figure 2.

With the parts of the fastener assembled in normal position, as shown in Figure 2, it will be seen that the flat surfaces 21 of each set or pair of lugs converge toward the adjacent belt end edge and are disposed at an angle to the respective parallel arms of the loops which angle is indicated at $x$. When the belt flexes, as upon entering the pulley and leaving the tangent, there is a definite tendency of the leading belt end to fly up above the tangent plane and thus produce a "whipping" action which, if not prevented, is exceedingly severe on the fastened parts, particularly the two elements or sections of the rocker hinge pin, since such "whipping" action tends to scuff or slide the rolling bearing faces, such as indicated at 18, upon each other. Such "whipping" action also has a very definite tendency to crystallize the metal of the loops of the attaching members, due to the repeated impingement of the hinge pin elements against the loop arms, if such "whipping" action is not prevented. With the construction of loops and hinge pin elements as shown, it is apparent that such whipping action is eliminated or at least reduced to a minimum, while at the same time permitting the desired flexibility in the connection as shown in Figure 3. It will further be seen that the lugs 20—20ª serve as stops to limit the angular movement. As clear from Figure 3, the upper flat surfaces 21 of the lugs on both hinge pin elements 16 and 17 engage the upper arms 12ª and 13ª of the loops as indicated at $z$ and prevent the improper displacement of the belt ends relative to each other. To better understand this action, it may be assumed, in Figure 3, that the member A is on the leading end of the belt traveling in the direction indicated by the arrow $y$ and that the belt end to which the member B is attached, represents the tangent travel of the belt. As the belt end with the member A reaches the pulley, the tendency is for the loops 12 of member A to be thrown up above the loops of the attaching member B but, on account of the relative dimensions of the pin elements 16 and 17 and spacing of the loop arms and the location and formation of the lugs 20 and 20ª, this action is prevented and the relative angular movement between the loops of the two members A and B is about an approximately fixed center.

In addition to the limiting function hereinbefore described, the lugs 20—20ª perform also the usual function of preventing accidental endwise displacement of the hinge pin since it is evident that the lugs 20—20ª will prevent any substantial endwise movement of the pin elements so long as there is any tension on the belt ends.

It will also be noted that the metal of the lugs 20—20ª is disposed most advantageously to prevent bending of the hinge pin elements under load and particularly when the belt ends are at an angle to each other as shown in Figure 3. As the two attaching members of the fastener depart from a position of alinement, the rolling point of contact between the two rocker hinge pin elements approaches the thinner edges of the double convex formations, and hence the amount of metal available in the main body portions of the hinge pin elements is less to resist bending strains near the edges. The lugs 20—20ª are obviously so located that they reinforce the thinner edges of the hinge pin elements and hence add to their strength against bending.

The construction of the hinge pin elements is such that the same may obviously be made by rolling and, the two elements being of preferably like construction, may be made on the same set of rolls, thus reducing the cost of manufacture to a minimum. As will further be understood by those skilled in the art, the hinge pin elements may be rolled to any desired length and broken off to suit different widths of belt.

Although there has herein been shown and described what is now considered the preferred manner of carrying out the invention, the same is merely illustrative and all changes are contemplated that come within the scope of the claims appended hereto.

What is claimed is:

1. In a fastener of the character described, the combination with members attachable to the adjacent ends of a belt, said members having interdigitated loops, the loops having substantially parallel arms; of a hinge pin disposed within the loops, said pin comprising two elements having opposed cooperable rolling bearing surfaces, each element also having, on the side opposite its rolling bearing surface, sets of lugs spaced longitudinally thereof to correspond with the spacing of alternated loops, each set comprising two lugs, the lugs being formed with shoulders engageable and cooperable with the arms of corresponding loops to limit the angular movement between the attaching members.

2. In a fastener of the character described, the combination with members attachable to adjacent ends of a belt, said members having interdigitated loops, the loops having spaced arms connected by rounded ends; of a hinge pin disposed within the loops, said pin comprising two elements having opposed cooperable rolling bearing surfaces, each of said elements also having, on the side opposite its rolling bearing surface, seating surfaces to fit the rounded ends of the loops, said seating surfaces being alternated with lugs, the lugs having outer flat faces which, when the belt ends are in alinement, extend at an angle to the arms of the loops.

3. As an article of manufacture, a hinge pin for belt fasteners, said pin comprising two like elements, each element being substantially of double convex cross section, the convex surface along one side being continuous and adapted to form a rolling bearing surface, the other convex surface constituting a seating surface for loops of a fastener, each element on its seating surface side being formed with lugs spaced longitudinally of the pin element, each lug having a substantially flat surface extending in a plane approximately tangential to said curved seating surface at the line of junction of the two convex surfaces of the pin element.

4. As an article of manufacture, a hinge pin for belt fasteners, said pin comprising two like elements, each being of substantially double convex cross section, one of the convex surfaces extending free from interruption for the length of the pin to provide a rolling bearing surface, the other convex surface having formed thereon, pairs of limiting lugs spaced at intervals lengthwise of the pin element, the lugs of each pair being disposed on opposite sides of the longitudinal center line of the convex surface on which formed and each lug having an outer flat face.

5. As an article of manufacture, a hinge pin for belt fasteners, said pin comprising two like elements each being of substantially double convex cross section, one of the convex surfaces extending free from interruption for the length of the pin to provide a rolling bearing surface, the other convex surface having formed thereon, pairs of limiting lugs spaced at intervals lengthwise of the pin element, the lugs of each pair being disposed on opposite sides of the longitudinal center line of the convex surface on which formed, each lug having two outer faces, one substantially tangent to the edge of the pin element formed at the intersection of the two convex surfaces thereof, and the other face being substantially tangent at the center line of the convex surface on which formed.

6. An element for a sectional rocker hinge pin for belt fasteners and the like, said element being generally elongated and of substantially double convex cross section, one of the convex surfaces extending continuously and adapted to form a rolling bearing surface with a corresponding element, the other convex surface having formed thereon, at intervals spaced longitudinally of the element, lugs, the lugs being spaced to correspond substantially with the spacing of loops of belt fastener attaching members with which adapted to be used, each of said lugs having an end face disposed substantially tangential to the convex surface on which the lug is formed at the edge line of intersection of the two convex surfaces of the pin element.

7. An element for a sectional rocker hinge pin for belt fasteners, and the like, said element being provided along one side thereof, with a convex rolling bearing surface, said element being provided along the other side thereof with a seating surface adapted to cooperate with loops of an attaching member, said seating surface being provided, at spaced intervals therealong, with lugs, the lugs being disposed on opposite sides of the longitudinal center line of said seating surface, said lugs having outer flat faces.

JOHN C. OLSEN.